(12) United States Patent
Carlson et al.

(10) Patent No.: US 12,502,697 B2
(45) Date of Patent: Dec. 23, 2025

(54) MOTORIZED VALVE WITH AUTOMATIC RINSE AND ASSOCIATED METHODS

(71) Applicant: KZValve, LLC, Greenwood, NE (US)

(72) Inventors: Daniel Carlson, Ashland, NE (US); Larry Erdkamp, Lincoln, NE (US)

(73) Assignee: KZValve, LLC

( * ) Notice: Subject to any disclaimer, the term of this patent is extended or adjusted under 35 U.S.C. 154(b) by 22 days.

(21) Appl. No.: 18/733,313

(22) Filed: Jun. 4, 2024

(65) Prior Publication Data
US 2024/0408653 A1 Dec. 12, 2024

Related U.S. Application Data

(60) Provisional application No. 63/471,421, filed on Jun. 6, 2023.

(51) Int. Cl.
- *B08B 9/032* (2006.01)
- *F16K 5/06* (2006.01)
- *F16K 5/08* (2006.01)

(52) U.S. Cl.
CPC ............ *B08B 9/032* (2013.01); *F16K 5/0647* (2013.01); *F16K 5/08* (2013.01); *B08B 2209/032* (2013.01)

(58) Field of Classification Search
CPC ......... F16K 5/0647; F16K 5/08; B08B 9/032; B08B 2209/032
See application file for complete search history.

(56) References Cited

U.S. PATENT DOCUMENTS

| | | | |
|---|---|---|---|
| 7,013,917 B2* | 3/2006 | Joseph, III | ............ F16K 5/0605 137/624.13 |
| 2007/0205145 A1 | 9/2007 | Carnell | |
| 2009/0108220 A1* | 4/2009 | Staev | ....................... F16K 31/04 251/129.12 |
| 2017/0252766 A1 | 9/2017 | Post et al. | |
| 2020/0378517 A1 | 12/2020 | Weiss et al. | |
| 2024/0408653 A1* | 12/2024 | Carlson | ............... F16K 11/0876 |

FOREIGN PATENT DOCUMENTS

| | | |
|---|---|---|
| EP | 2998016 A1 | 3/2016 |
| JP | 2016-196976 A | 11/2016 |
| JP | 2017-009128 A | 1/2017 |

OTHER PUBLICATIONS

European Search Report for EP Patent Application No. 24180002.8, Issued on Oct. 10, 2024, 6 pages.

* cited by examiner

*Primary Examiner* — Sharidan Carrillo
(74) *Attorney, Agent, or Firm* — FAEGRE DRINKER BIDDLE & REATH

(57) ABSTRACT

Aspects of the present disclosure relate to systems and methods for automatically rinsing out residual fluid from a valve assembly. In examples, an actuator attached to a valve assembly may rotate a valve ball of the assembly through a series of movements across the opening of a valve port. Rinsing fluid may be provided during the series of movement to rinse the valve port of residual fluid. In some examples, the actuator may be a discrete device or a controlled area network (CAN) device. The automated rinsing cycle improves the clearing of residual fluids from the valve assembly, significantly reducing the potential for fluid contamination during subsequent use of the valve assembly.

13 Claims, 5 Drawing Sheets

MOTORIZED VALVE WITH AUTOMATIC RINSE AND ASSOCIATED METHODS

CROSS-REFERENCE TO RELATED APPLICATION

This application claims the benefit of U.S. Application No. 63/471,421, filed Jun. 6, 2023, the entirety of which is incorporated herein by reference for all purposes.

FIELD

This disclosure relates generally to systems and methods for performing an automated body cavity rinse of a motorized valve with a rinsing fluid. Disclosed embodiments include a valve assembly operably connected to an actuator.

BACKGROUND

Many industries utilize valve assemblies for fluid delivery and transportation of fluids. Valve assemblies may facilitate fuel delivery, anti-icing and de-icing applications, agriculture uses, and the transfer of other harsh chemicals for a plurality of uses. However, once the valve assembly completes the delivery of these harsh chemicals, any rinsing of residual fluid is often performed by merely provide a rinsing fluid to the valve in an open position. Without thorough clearing, residual fluid may remain in the valve assembly potentially contaminating the system during future use. The contamination may result in unintentional mixing of different fluids, application of an old or incorrect fluid, and possibly damage to the valve assembly itself or the fluid receiving system (e.g., agricultural field, airplane, oil, and gas processing facility, etc.) to which the fluid is being delivered. Any damage to the valve assembly or fluid receiving system could result in significant maintenance costs and missed production time.

SUMMARY

Aspects of the present disclosure relate to systems and methods for automatically rinsing out residual fluid from the body cavity of a valve assembly. According to an example, a motorized valve assembly may be operably connected to an actuator having instructions for performing an automatic rinse cycle of the valve assembly. Upon receiving a signal to initiate the rinse, the actuator may rotate the valve ball to an open position relative to the port of the valve assembly, then rotate it further to a first rinse position. At the first rinse position, a portion of the valve ball opening may be obstructed by the valve endcap such that when a rinsing fluid flows through the valve assembly a portion of the flow is displaced back into the valve assembly to clear residual fluid. After a first predetermined period of time and while the rinsing fluid is still flowing, the actuator directs the valve ball to return to the open position then counter-rotates the valve ball to a second rinse position. The second rinse position is in a second direction opposite the first rinse position and is also partially obstructed by the valve endcap to facilitate clearing residual fluid from within the valve assembly. The valve ball may remain at the second rinse position for a second predetermined period of time. The actuator may rotate the valve ball through each position with rinsing fluid flowing until the rinsing cycle is complete. In some examples, the actuator may be a discrete device or a controlled area network (CAN) device. The automated rinsing cycle improves the clearing of residual fluids from the valve assembly, significantly reducing the potential for fluid contamination.

According to an embodiment of the present disclosure, a valve control system is disclosed comprising a valve assembly including one or more ports, a valve ball, an actuator, and memory storing instructions that, when executed by the actuator, cause the system to perform a set of operations, the set of operations including, receiving an initiate signal directing the actuator to perform an automatic rinse cycle, rotating the valve ball to an open position relative to a port, rotating the valve ball to a first rinse position, wherein the first rinse position is a first predetermined angle of rotation in a first direction from the open position, initiating a flow of rinsing fluid through the valve assembly, and after initiating the flow of rinsing fluid performing a series of movements of the valve ball, including, maintaining the valve ball in the first rinse position for a first predetermined period of time, returning the valve ball to the open position, counter-rotating the valve ball to a second rinse position, wherein the second rinse position is a second predetermined angle of rotation in a second direction from the open position, the second direction being opposite to the first direction, maintaining the valve ball in the second rinse position for a second predetermined period of time, and returning the valve ball to the open position.

In various embodiments of the disclosure, wherein the first and second predetermined angles of rotation are between 10 degrees and 80 degrees, and optionally, wherein the first predetermined angle of rotation is substantially the same as the second predetermined angle of rotation.

In various embodiments of the disclosure, wherein the actuator includes at least one of a discrete device or a CAN device.

In various embodiments of the disclosure, wherein the set of operations further includes determining the port to rinse based on the initiate signal.

In various embodiments of the disclosure, wherein the set of operations further includes, illuminating a light emitting diode on a variable basis when the actuator initiates the automatic rinse cycle.

In various embodiments of the disclosure, wherein the set of operations further includes, exiting the automatic rinse cycle, including rotating the valve ball to the open position.

According to an embodiment of the present disclosure, a method for controlling a valve using a discrete actuator, the method comprising receiving an initiate signal directing the actuator to perform an automatic rinse cycle, rotating a valve ball to an open position relative to a port, rotating the valve ball to a first rinse position, wherein the first rinse position is a first predetermined angle of rotation in a first direction from the open position, initiating a flow of rinsing fluid through the valve assembly and after initiating the flow of rinsing fluid performing a series of movements of the valve ball including, maintaining the valve ball in the first rinse position for a first predetermined period of time, returning the valve ball to the open position, counter-rotating the valve ball to a second rinse position, wherein the second rinse position is a second predetermined angle of rotation in a second direction from the open position, the second direction being opposite to the first direction, maintaining the valve ball in the second rinse position for a second predetermined period of time, and returning the valve ball to the open position, In various embodiments of the disclosure, wherein the first and second predetermined angles of rotation are between 10 degrees and 80 degrees, and optionally, wherein the first predetermined angle of rotation is substantially the same as the second predetermined angle of rotation.

In various embodiments of the disclosure, wherein the initiate signal further includes a signal in a range between 5 Hz and 2000 Hz with a duty cycle in a range between 5 percent and 95 percent.

In various embodiments of the disclosure, wherein the set of operations further includes, receiving an exit signal, wherein the exit signal is a continuous high signal.

In various embodiments of the disclosure, wherein the set of operations further includes, receiving an exit signal, wherein the exit signal is a continuous low signal.

In various embodiments of the disclosure, wherein the set of operations further includes, determining the initial voltage state of a feedback line prior to entering the automatic rinse cycle, and when the automatic rinse cycle is initiated, directing the feedback line to voltage negative.

In various embodiments of the disclosure, wherein the set of operations further includes, exiting the automatic rinse cycle, rotating the valve ball to the open position, directing the feedback line to the initial voltage state, determining the state of one or more signal input lines, and rotating the valve ball to the position indicated by the state of the one or more signal input lines.

In various embodiments of the disclosure, wherein the set of operations further includes, determining the port to rinse based on the initiate signal.

In various embodiments of the disclosure, wherein the set of operations further includes, illuminating a light emitting diode on a variable basis when the automatic rinse cycle is initiated.

According to an embodiment of the present disclosure, A method for controlling a valve using a CAN actuator, the method comprising receiving an initiate signal directing the actuator to perform an automatic rinse cycle, rotating a valve ball to an open position relative to a port, rotating the valve ball to a first rinse position, wherein the first rinse position is a first predetermined angle of rotation in a first direction from the open position, initiating a flow of rinsing fluid through the valve assembly and after initiating the flow of rinsing fluid performing a series of movements of the valve ball including, maintaining the valve ball in the first rinse position for a first predetermined period of time, returning the valve ball to the open position, counter-rotating the valve ball to a second rinse position, wherein the second rinse position is a second predetermined angle of rotation in a second direction from the open position, the second direction being opposite to the first direction, maintaining the valve ball in the second rinse position for a second predetermined period of time, and returning the valve ball to the open position.

In various embodiments of the disclosure, wherein the first and second predetermined angles of rotation are a range between 10 degrees and 80 degrees, and optionally, wherein the first predetermined angle of rotation is substantially the same as the second predetermined angle of rotation.

In various embodiments of the disclosure, wherein the set of operations further including, determining the port to rinse based on the initiate signal.

In various embodiments of the disclosure, wherein the set of operations further including, illuminating a light emitting diode on a variable basis when the automatic rinse cycle is initiated.

In various embodiments of the disclosure, wherein the set of operations further includes, exiting the automatic rinse cycle, and rotating the valve ball to the position indicated by the exit signal.

The foregoing embodiments are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Definitions and Terminology

Figure 1:
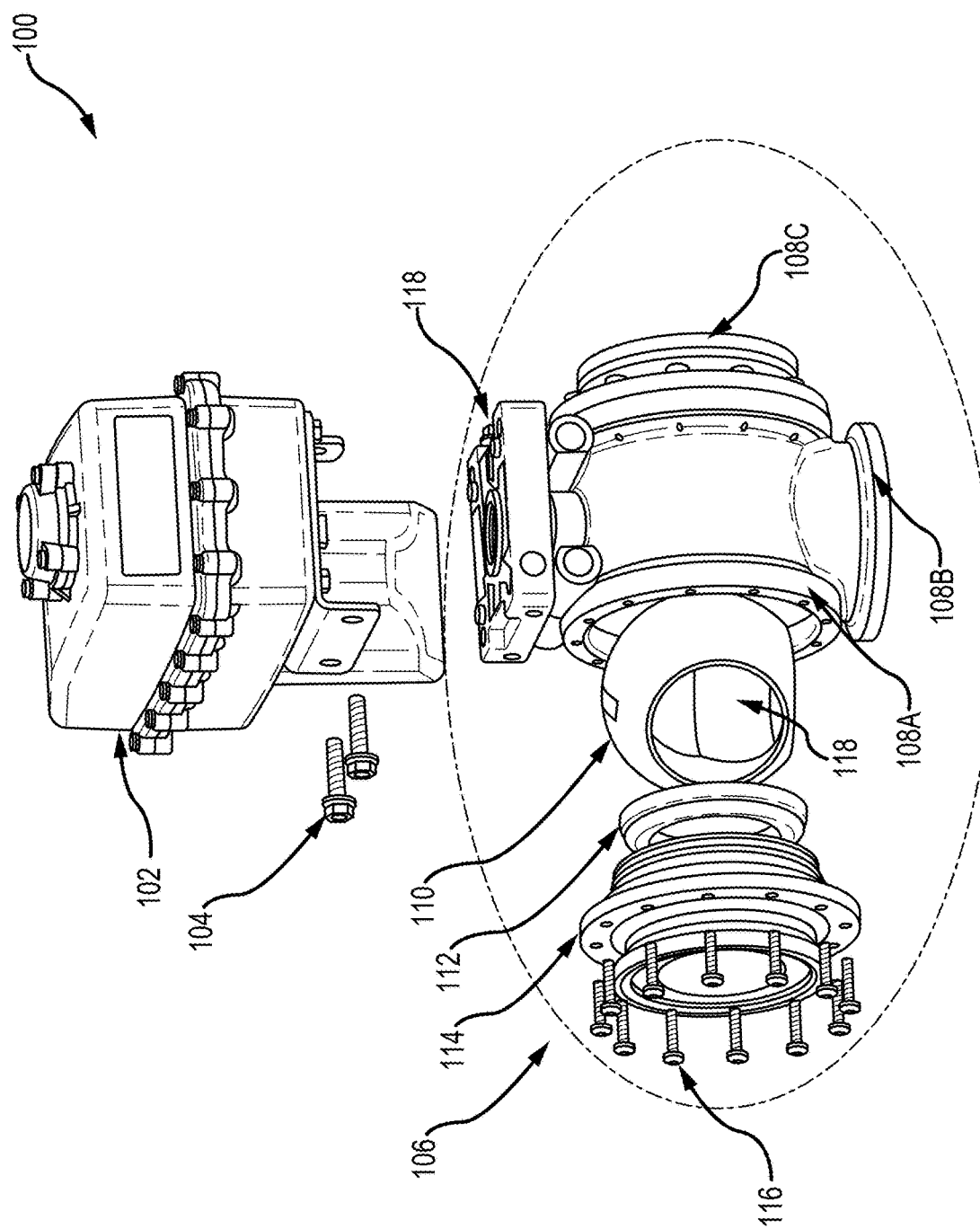
FIG. 1 is an illustration of a valve assembly with an actuator for performing an automatic rinse cycle in accordance with embodiments.

This disclosure is not meant to be read in a restrictive manner. For example, the terminology used in the application should be read broadly in the context of the meaning those in the field would attribute such terminology.

As the terms are used herein with respect to ranges of measurements "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale but may be exaggerated to illustrate various aspects of the present disclosure, and in that regard, the drawing figures should not be construed as limiting.

FIG. 1 is an illustration of a valve assembly with an actuator for performing an automatic rinse in accordance with embodiments. FIG. 1 includes an actuator 102, one or more fasteners 104 for fastening the actuator 102 to the valve assembly 106 at the mounting interface 118. The actuator 102 may be a device for controlling elements of the valve assembly 106 by providing instructions to perform an auto rinse cycle of the valve assembly 106. The actuator 102 will be described in greater detail with respect to FIG. 2. The valve assembly 106 includes one or more valve ports 108A-C, one or more valve balls 110 each having a valve ball opening 118, one or more valve seats 112, one or more valve endcaps 114, and one or more fasteners 116. While only one instance of a valve ball 110, a valve seat 112, and valve endcap 114 are shown as part of the valve assembly 106, it will be appreciated by one having skill in the art that each valve port 108A-C may have an instance of a valve ball 110, a valve seat 112, a valve endcap 114, and one or more fasteners 116. For ease of discussion the valve ports 108A-C, will be referenced in the singular as valve port 108. The valve seat 112 acts as a seal for the valve assembly 106. The valve endcap 114 protects against leakage from the valve assembly, contains all or some of the valve seat 112 and valve ball 110, and connects to the valve port 108 via the one or more fasteners 116.

The valve ball 110 may direct the flow of a liquid, such as a rinsing fluid, through the valve assembly 106. As will be described in greater detail with respect to FIGS. 3A-E, the valve ball 110 may be rotatable such that the full range of travel may be 180 degrees of rotation across the valve port 108. As such, a first closed position for the valve ball 110 may be considered as 0 degrees with the valve ball opening 118 on one side (e.g., either left or right) of the valve port 108 and completely obstructed by one or more of the valve port 108, valve seat 112, and/or valve endcap 114. The actuator 102 may rotate the valve ball 110 to an open position, which may be considered about 90 degrees and the valve ball 110 having little to no obstruction by one or more of the valve port 108, valve seat 112, and/or valve endcap 114. From the open position the valve ball 110 may further travel to a second closed position in a direction opposite the first closed position, approximately 180 degrees opposite the first closed position and completely obstructed by one or more of the valve port 108, valve seat 112, and/or valve endcap 114. As the valve ball 110 travels from the first closed position to the second closed position or vice versa, the valve ball opening 118 may be obstructed at varying levels by one or more of the valve port 108, valve seat 112, and/or valve endcap 114. The position of the valve ball 110 may be determined by any suitable sensor such as a magnetic position sensor.

Figure 2:
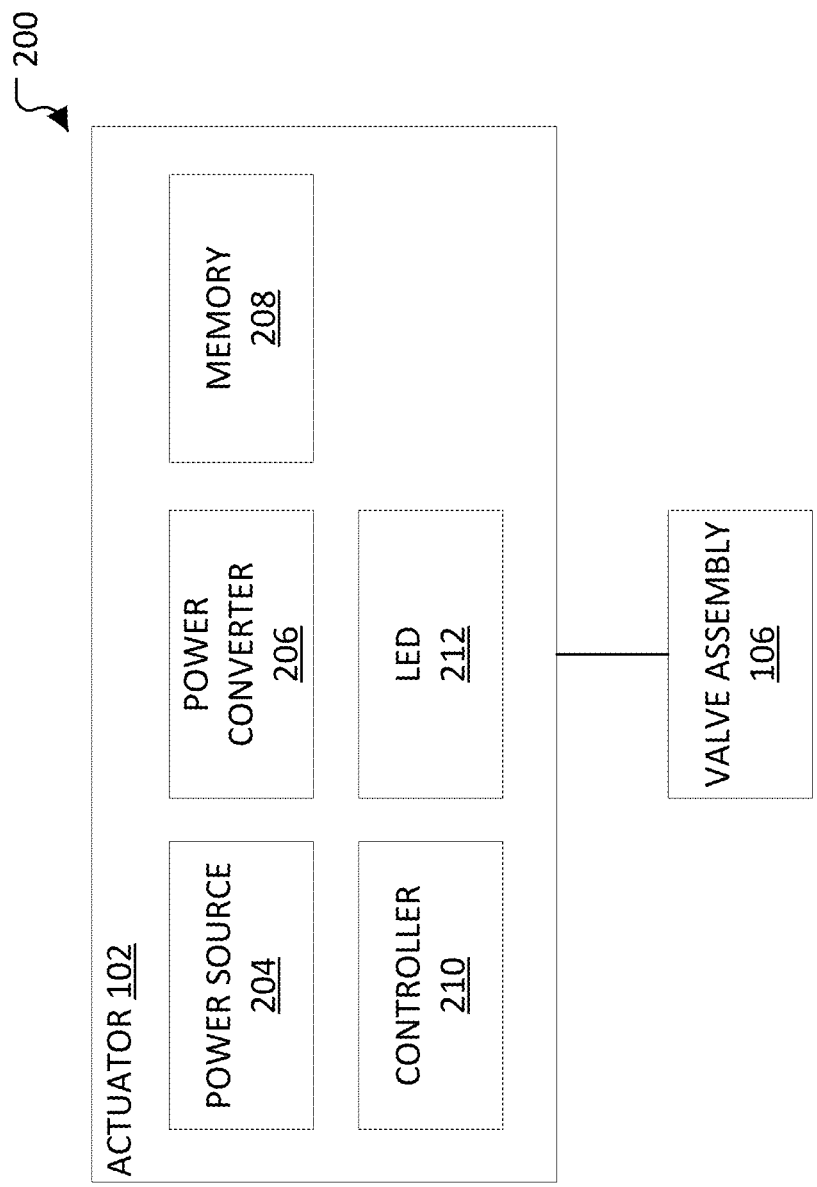
FIG. 2 is a diagrammatic illustration of a system for performing an automatic rinse cycle of a valve assembly in accordance with embodiments.

FIG. 2 is a diagrammatic illustration of a system for performing an automatic rinse cycle of a valve assembly in accordance with embodiments. The system 200 may include of an actuator 102 and valve assembly 106. The actuator 102 may include a power source 204, a power converter 206, a memory 208, a controller 210, and a light emitting diode (LED) 212. The power source 204 may be any suitable source. In examples, the power source 204 includes a charging coil coupled to an energy storage device to enable inductive charging of the power source 204 by an external device. Alternatively, or in addition, embodiments of the power source 204 may include a battery. The power converter 206 may be any suitable power converter which may be used to supply power from the power source 66 to the elements of the actuator 102.

The memory 208 may be any suitable known or otherwise conventional structures configured for operation with controller 210. The memory may contain instructions and other information relating to the automatic rinse cycle for the valve assembly 106. The controller 210 may be any suitable known or otherwise conventional electronics structures such as discrete circuit components, application specific integrated circuits (ASICs), and/or programmed processors. The controller directs the function of the actuator 102 in performing the automatic rinse cycle. The LED 212 may be any suitable known or otherwise conventional LED. The LED 212 indicates that the automatic rinse cycle is in progress. In some examples the LED may remain illuminated throughout the automatic rinse cycle. In other examples the LED may illuminate on a variable basis (e.g., blink) when the automatic rinse cycle is in progress.

In some examples, the actuator 102 may be a discrete device, while in other examples the actuator 102 may be a CAN device. In examples where the actuator 102 is a discrete device, the signal input to initiate the automatic rinse cycle may be a signal input in a range between 5 Hz to 2000 Hz with a duty cycle in a range between 5 percent to 95 percent. In some examples, the signal input may be in the range from 5 Hz to 50 Hz, 50 Hz to 200 Hz, 200 Hz to 500 Hz, 500 Hz to 1000 Hz, 1000 Hz to 1500 Hz, 1500 Hz to 2000 Hz, or any other suitable value therebetween or combination of ranges thereof. In some examples, the duty cycle may be in the range from 5 percent to 10 percent, 10 percent to 20 percent, 20 percent to 40 percent, 40 percent to 60 percent, 60 percent to 80 percent, 80 percent to 95 percent, or any other suitable value therebetween or combination of ranges thereof. For example, the signal input may be 100 Hz at a 50 percent duty cycle, plus or minus 10 percent. The signal input to exit the automatic rinse cycle may be a continuously low or a continuously high signal. In examples where the valve assembly 106 has multiple ports 108 that could be rinsed and the actuator 102 is a discrete device, the actuator 102 will receive a signal input directing it to rinse a specific port 108. As such, a normal flow of operations for a valve assembly 106 having multiple ports would be to receive an initiate signal with a signal indicating which port 108 (e.g., 108A) to rinse and performing the automatic rinse cycle for that port 108. Then the actuator 102 would receive a continuously high or low signal, exit the automatic rinse cycle, and if an additional port should be rinsed the actuator 102 will receive another initiate signal with an additional signal indicating a different port 108 (e.g., 108B) to rinse. For discrete devices, during the automatic rinse cycle the feedback line may be voltage negative. Upon exiting the automatic rinse cycle the feedback line may return to the same state it was in prior to initiating the automatic rinse cycle and the actuator 102 may direct the valve to the state indicated by the signal input lines. In other examples, the actuator 102 may be a CAN device. In these examples, the automatic rinse cycle may be entered and exited via a signal provided via the CAN.

Figure 3C:
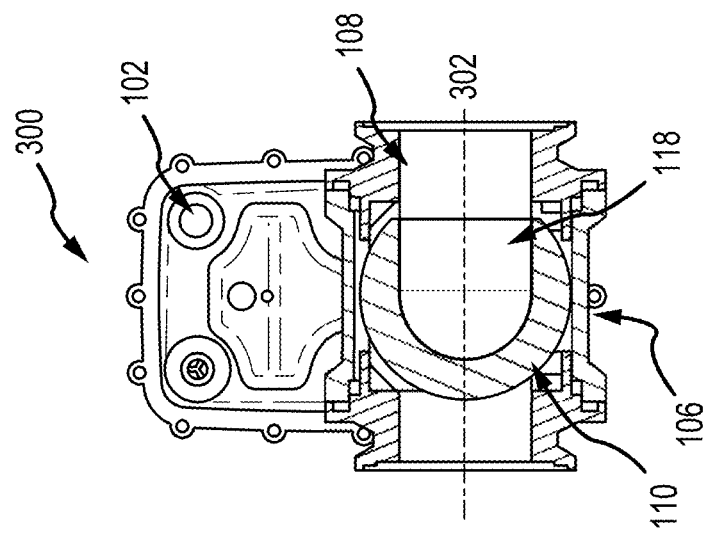
FIGS. 3A-3E are illustrations of a valve assembly with the valve rotated to various positions while performing an automatic rinse cycle in accordance with embodiments.
Figure 3B:
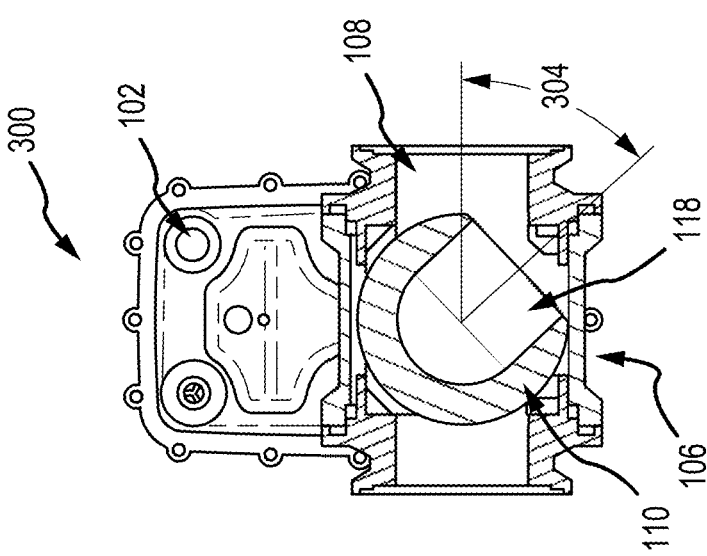
Figure 3A:
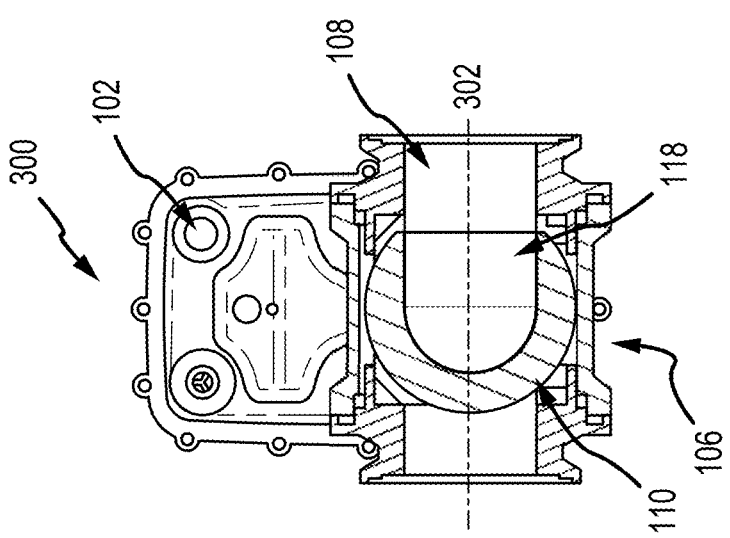
Figure 3D:
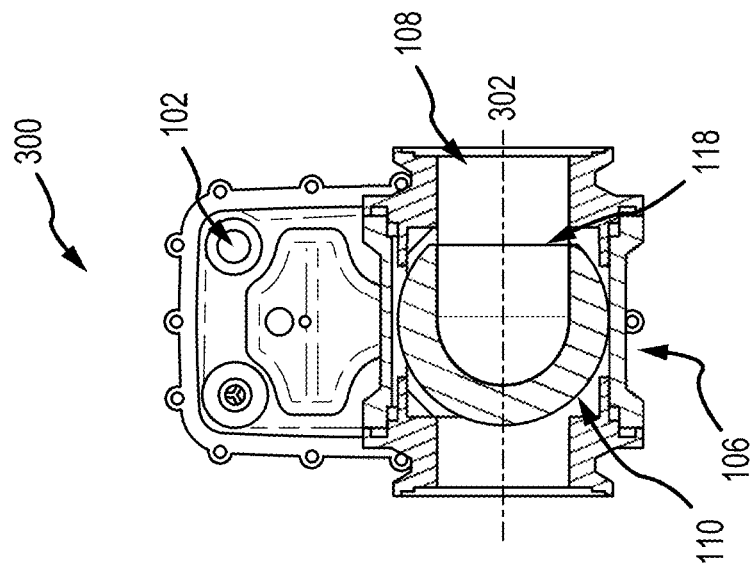

FIGS. 3A-3E are illustrations of a valve assembly with the valve rotated to various positions while performing an automatic rinse cycle in accordance with embodiments. Initially, the valve ball 110 may be a variety of positions based on the previous operating state of the valve assembly 106 and actuator 102. Upon receipt of a signal to initiate an automatic rinse cycle, the actuator 102 will rotate the valve ball 110 to an open position 302 based on the port 108 that was identified to be rinsed, as shown in FIG. 3A. The open position 302 may be a position approximately ninety degrees of rotation from the closed position such that the valve ball 110 has little to no obstruction by one or more of the components of the valve assembly 106. As shown in FIG. 3A the open position 302 may have the valve ball 110 rotated to a position such that the valve ball opening 118 and valve port 108 are closely aligned with each other. In FIG. 3A, there may or may not be rinsing fluid flowing, depending on a particular operating condition.

Once the valve ball 110 is in the open position 302, the actuator 102 may rotate the valve ball 110 to a first rinse position 304, as illustrated in FIG. 3B. The first rinse position 304 may be a predetermined angle of rotation in a first direction from the open position 302. The angle of rotation may be a range from ten degrees to eighty degrees from the open position 302. In some examples, the first rinse position 304 positions the valve ball 110 and valve opening 118 such that it is at least partially obstructed by the elements of the valve assembly 106 and not closely aligned with the valve port 108. While in FIG. 3B the first rinse position 304 is shown to be in a particular direction of rotation (e.g., down) from the open position 302, it will be appreciated by one having skill in the art that the first rinse position 304 could be in any direction (e.g., up, down, left, right, etc.) from the open position 302.

In the first rinse position 304, the actuator 102 may initiate the flow of rinsing fluid through the valve assembly 106 (or the flow of rinsing fluid may be previously initiated). In some examples, once initiated the rinsing fluid may continue flowing throughout the remainder of the automatic rinsing cycle. In other examples, the rinsing fluid may be activated to flow in specific positions (e.g., the open position 302, first rinse position 304, and second rinse position 306) or patterns (e.g., with flow being inactivated while the valve ball 110 is being rotated and reactivated at discrete positions). In still other examples, the flow may be modulated to further enhance the rinsing process, such as activating a pulsatile flow, variable flow, or other modulation. When the rinsing fluid is flowing it will come in contact with the elements of the valve assembly 106 and exit through the unobstructed portion of the valve port 108, thereby rinsing any residual fluid from that portion of the valve assembly 106.

The valve ball 110 may remain in the first rinse position 304 for a first predetermined period of time. In examples, the first predetermined period of time may be a second, two seconds, a fraction of a second, or a few seconds to many seconds, for example three seconds. In other examples, the first predetermined period of time may be so short as to be a continuous rotation of the valve ball 110 across the range of travel described herein. In such an example, the valve ball 110 may continuously rotate without pausing at a single position for an extended period of time until the completion of the automatic rinse cycle. The length of the first predetermined period of time may be defined by a user and/or pre-programmed as part of the automatic rinse cycle.

As illustrated in FIG. 3C, once the first predetermined period of time in the first rinse position 304 elapses, the valve ball 110 will counter rotate back to the open position 302. The rotation of the valve ball is a slow sweep across the opening of the port in the direction of rotation with the rinsing fluid flowing. The slow sweep provides the benefit of rinsing fluid contacting the valve assembly 106 in such a way to force residual fluid from the valve assembly 106 that otherwise would not be rinsed by traditional rinsing methods. Then in FIG. 3D, the valve ball 110 will counter rotate to a second rinse position 306. The second rinse position 306 may be a predetermined angle of rotation in a second direction from the open position 302, where the second direction is opposite to the first direction. The angle of rotation may be a range from ten degrees to eighty degrees from the open position 302, for example, although a variety of angular limits are contemplated. In some examples, the second rinse position 306 positions the valve ball 110 and valve opening 118 such that it is at least partially obstructed by the elements of the valve assembly 106 and not closely aligned with the valve port 108.

Figure 3E:
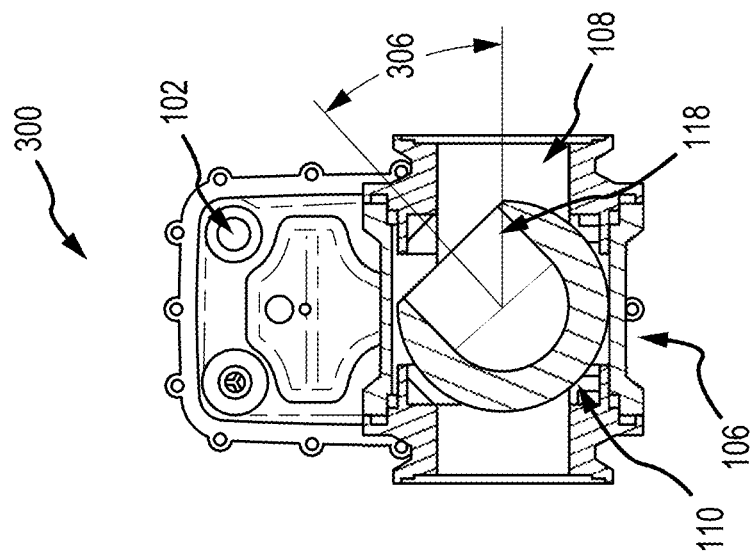

The valve ball 110 may be maintained in the second rinse position 306 for a second predetermined period of time then return to the open position 302 as shown in FIG. 3E. In some examples, the first and second predetermined periods of time may be substantially similar, such as they both may be 3 seconds or other value as appropriate. In other examples, the first and second predetermined periods of time may be different based on design choices by the user. In some examples, the second predetermined period of time may be a few seconds to many seconds, for example three seconds. In other examples, the second predetermined period of time may be so short as to be a continuous rotation of the valve ball 110 across the range of travel described herein. In such an example, the valve ball 110 may continuously rotate without pausing at a single position for an extended period of time until the completion of the automatic rinse cycle. The length of the second predetermined period of time may be defined by a user and/or pre-programmed as part of the automatic rinse cycle.

The series of movements from open position 302 to a first rinse position 304, counter-rotating back to the open position 302 then counter-rotating to the second rinse position 306 and rotating back to the open position 302 may be repeated as required during the automatic rinse cycle. The automatic rinse cycle may be exited when a signal is received to exit the cycle. The signal may be provided as direct input by a user or it may be received as part of a series of instructions for a pre-programmed automatic rinse cycle such that the pre-programmed cycle performs a certain series of movements then exits the automatic rinse cycle. When exiting the automatic rinse cycle the flow of rinsing fluid may be stopped. When exiting the automatic rinse cycle the actuator may receive an additional signal indicating the position that the valve ball 110 should be rotated to and perform the rotation.

Figure 4:
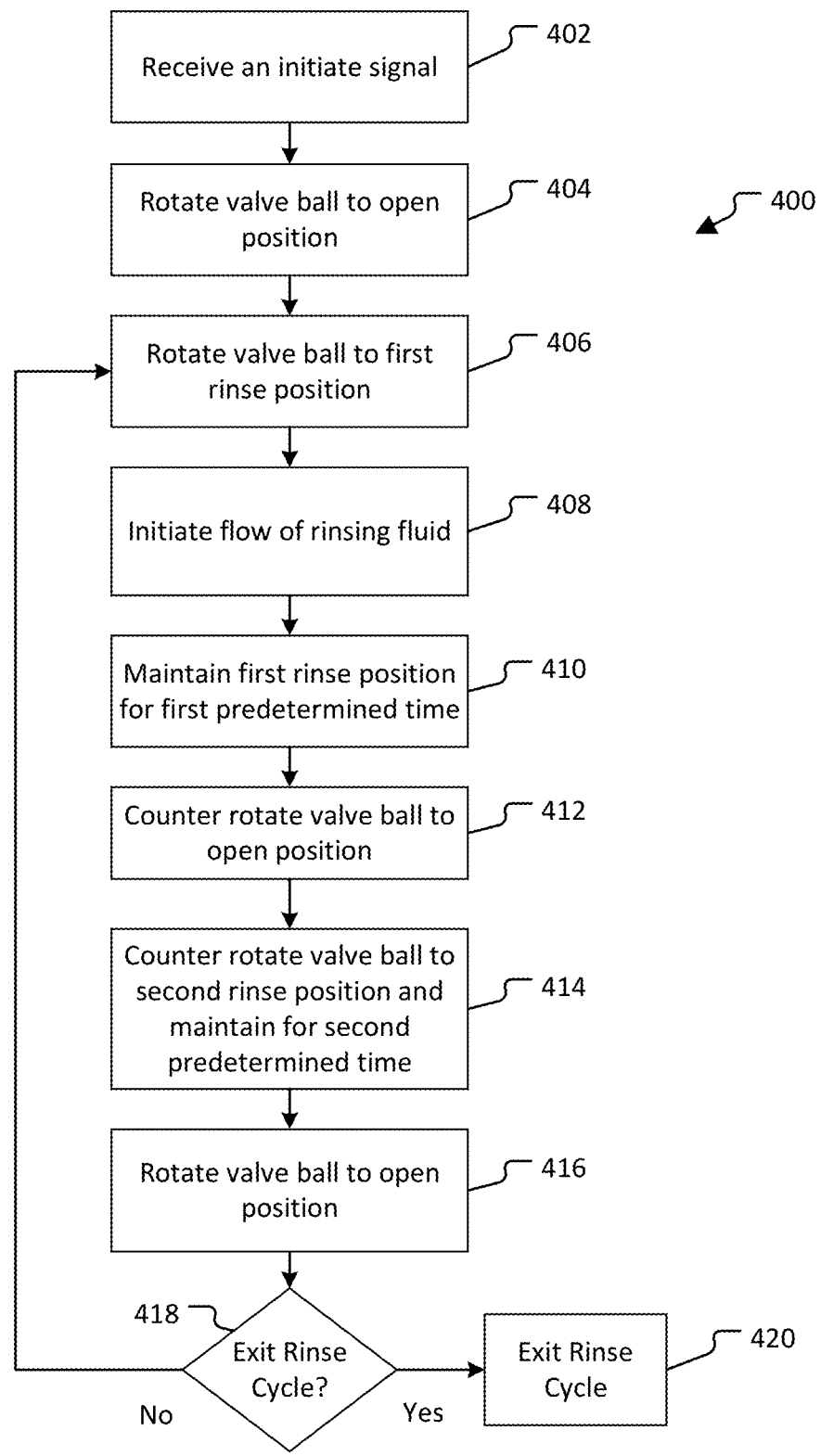
FIG. 4 is a flow diagram describing a method for performing an automatic rinse cycle in accordance with embodiments.

FIG. 4 is a flow diagram describing a method for performing an automatic rinse cycle in accordance with embodiments. At operation 402 a signal is received by the actuator to initiate the automatic rinse cycle. The initiate signal may include an indication of which valve port should be rinsed. At operation 404, the actuator will rotate the valve ball to an open position in the indicated port. The open position may be a position where the valve ball opening is closely aligned with the port.

At operation 406, the valve ball is rotated to a first rinse position. The first rinse position is a position that is first predetermined angle of rotation in a first direction from the open position. When the valve ball is in the first rinse position, at operation 408 the flow of rinsing fluid is initiated to flush the valve of any residual fluid. At operation 410, the valve ball may remain in the first rinse position for a first predetermined period of time before counter rotating to the open position at operation 412. The first predetermined period of time may be defined by the user or pre-programmed into the automatic rinse cycle.

At operation 414, the valve ball is counter rotated to the second rinse position which is a second predetermined angle of rotate in a second direction from the open position, with the second direction being opposite to the first direction of rotation. In some examples, the second predetermined angle of rotation may be substantially similar to the first predetermined angle of rotation, for example forty-five degrees in either direction. In other examples, the second predetermined angle of rotation may be different than the first predetermined angle of rotation. For example, the first predetermined angle of rotation may be forty-five degrees while the second predetermined angle of rotation may be 80 degrees. Differences in angles of rotation as well as the corresponding first and second rinsing positions may be design choices of the user based on a variety of considerations such as the type of valve assembly being rinsed, various positions where the rinse may be more or less effective, and/or where the residual fluid is located, etc.

The valve ball may be maintained at the second rinse position for a second predetermined period of time. The second predetermined period of time may be substantially similar to the first predetermined period of time, for example they may both be three seconds at each rinsing position. In other examples, the first and second predetermined periods of time may be different, for example the first predetermined period of time may be 3 seconds while the second predetermined period of time may be 6 seconds. Differences in periods of time may be design choices of the user based on a variety of considerations such as the type of valve assembly being rinsed, how long it takes to perform the rinse at each position, and/or where the residual fluid is located, etc.

At operation 416, the valve ball is rotated to the open position when the second predetermined period of time is reached. At operation 418 it is determined if the automatic rinse cycle should be exited. The indication to exit the rinse may be a signal received directly from a user and/or defined by a pre-programmed rinse cycle. If the rinse is not exited, flow progresses to operation 406 where the automatic rinse cycle continues with the valve ball being rotated to a subsequent rinse position.

Alternatively, if the signal to exit the rinse is received at operation 418, flow progresses to operation 420 where the automatic rinse cycle is exited. The steps of exiting the rinse may include stopping the flow of rinsing fluid and repositioning the valve ball to the commanded position.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The methods and order of operations for a method disclosed herein are exemplary, such that the steps of the method may be reorganized, added to, combined, and/or steps may be omitted as is contemplated by one having skill in the art. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for automatic rinsing of a valve assembly using a discrete actuator, the method comprising:
    providing a valve assembly comprising a valve ball,
    receiving an initiate signal from a controller to direct the actuator to perform an automatic rinse cycle of the valve assembly,
    rotating the valve ball to an open position relative to a port of the valve assembly,
    rotating the valve ball to a first rinse position, wherein the first rinse position is a first predetermined angle of rotation in a first direction from the open position,
    initiating a flow of rinsing fluid through the valve assembly, and
    after initiating the flow of rinsing fluid performing a series of movements of the valve ball including,
        maintaining the valve ball in the first rinse position for a first predetermined period of time,
        returning the valve ball to the open position,
        counter-rotating the valve ball to a second rinse position, wherein the second rinse position is a second predetermined angle of rotation in a second direction from the open position, the second direction being opposite to the first direction,
        maintaining the valve ball in the second rinse position for a second predetermined period of time, and
        returning the valve ball to the open position.

2. The method of claim 1, wherein the first and second predetermined angles of rotation are between 10 degrees and 80 degrees.

3. The method of claim 1, wherein the initiate signal further includes a signal in a range between 5 Hz and 200 Hz with a duty cycle in a range between 5 percent and 95 percent.

4. The method of claim 1, further comprising:
    exiting the automatic rinse cycle, and
    rotating the valve ball to the open position.

5. The method of claim 1, further comprising:
    determining the port of the valve assembly to rinse based on the initiate signal.

6. The method of claim 1, further comprising:
    illuminating a light emitting diode on a variable basis when the automatic rinse cycle is initiated.

7. The method of claim 2, wherein the first predetermined angle of rotation is substantially the same as the second predetermined angle of rotation.

8. A method for controlling automatic rinsing of a valve assembly using a controlled area network actuator, the method comprising:
    providing a valve assembly comprising a valve ball,
    receiving an initiate signal from a controller to direct the actuator to perform an automatic rinse cycle of the valve assembly,
    rotating the valve ball to an open position relative to a port of the valve assembly, rotating the valve ball to a first rinse position, wherein the first rinse position is a first predetermined angle of rotation in a first direction from the open position, initiating a flow of rinsing fluid through the valve assembly, and after initiating the flow of rinsing fluid performing a series of movements of the valve ball including, maintaining the valve ball in the first rinse position for a first predetermined period of time, returning the valve ball to the open position, counter-rotating the valve ball to a second rinse position, wherein the second rinse position is a second predetermined angle of rotation in a second direction from the open position, the second direction being opposite to the first direction, maintaining the valve ball in the second rinse position for a second predetermined period of time, and returning the valve ball to the open position.

9. The method of claim 8, wherein the first and second predetermined angles of rotation are a range between 10 degrees and 80 degrees.

10. The method of claim 8, further including, determining the port of the valve assembly to rinse based on the initiate signal.

11. The method of claim 8, further including, illuminating a light emitting diode on a variable basis when the automatic rinse cycle is initiated.

12. The method of claim 8, further including exiting the automatic rinse cycle, and rotating the valve ball to a position indicated by an exit signal.

13. The method of claim 9, wherein the first predetermined angle of rotation is substantially the same as the second predetermined angle of rotation.

* * * * *